United States Patent
Mayer et al.

(10) Patent No.: US 10,938,424 B2
(45) Date of Patent: Mar. 2, 2021

(54) SIGNED LOCAL OSCILLATOR LEAKAGE CANCELATION

(71) Applicant: INTEL IP CORPORATION, Santa Clara, CA (US)

(72) Inventors: Christian Mayer, Linz (AT); Jovan Markovic, Linz (AT)

(73) Assignee: Intel IP Corporation, Santa Clara, CA (US)

( * ) Notice: Subject to any disclaimer, the term of this patent is extended or adjusted under 35 U.S.C. 154(b) by 525 days.

(21) Appl. No.: 15/290,300

(22) Filed: Oct. 11, 2016

(65) Prior Publication Data

US 2018/0102794 A1    Apr. 12, 2018

(51) Int. Cl.
| | |
|---|---|
| *H04B 1/00* | (2006.01) |
| *H04B 1/40* | (2015.01) |
| *H04L 25/08* | (2006.01) |
| *H04B 1/04* | (2006.01) |
| *H04B 1/525* | (2015.01) |

(52) U.S. Cl.
CPC ......... *H04B 1/0028* (2013.01); *H04B 1/0475* (2013.01); *H04B 1/40* (2013.01); *H04L 25/08* (2013.01); *H04B 1/525* (2013.01)

(58) Field of Classification Search
USPC ......... 375/297, 316, 232, 229; 455/313, 126
See application file for complete search history.

(56) References Cited

U.S. PATENT DOCUMENTS

| | | | |
|---|---|---|---|
| 8,213,542 B2 | 7/2012 | van Waasen | |
| 2002/0048326 A1* | 4/2002 | Sahlman | H03F 1/3229 375/297 |
| 2003/0087614 A1 | 5/2003 | Kramer | |
| 2009/0225903 A1* | 9/2009 | van Waasen | H03C 1/36 375/316 |
| 2012/0263260 A1 | 10/2012 | Van Wassen | |
| 2013/0203366 A1 | 8/2013 | Moreira | |
| 2016/0094235 A1 | 3/2016 | Kuttner et al. | |

OTHER PUBLICATIONS

International Search Report dated Oct. 19, 2017 in connection with International Application No. PCT/US2017/048568.

* cited by examiner

*Primary Examiner* — Wednel Cadeau
(74) *Attorney, Agent, or Firm* — Schiff Hardin LLP (57) ABSTRACT

A communication system receives an input signal along a signal processing path and generates a converted output signal via a digital-to-analog converter (DAC). The signal processing path branches into two different branches, a magnitude branch and a sign branch for different components of the baseband signal. A local oscillator (LO) provides a carrier signal to the signal processing path at the DAC and further generates an LO leakage signal comprising a signed LO leakage and an unsigned LO leakage during the up-conversion of signals of the sign branch with a carrier. An unsigned LO suppression component is configured to reduce or eliminate the unsigned LO leakage and a signed LO suppression component is configured to reduce or eliminate the signed LO leakage form a baseband signal of the signal processing path.

25 Claims, 6 Drawing Sheets

SIGNED LOCAL OSCILLATOR LEAKAGE CANCELATION

BACKGROUND

Signals are often processed in one format and converted to another for various different applications. For example, digital signals can be converted to analog signals, or analog signals can be converted to digital signals. In wireless communication systems these signals can then be mixed with a local oscillator signal to obtain a signal with a desired frequency, such as an analog signal converted from a digital input. In wireless transmitters signals are processed digitally at a baseband frequency, converted to an analog signal via a digital to analog converter (DAC), and mixed with a radio frequency (RF) signal to obtain a radio frequency transmit signal, which is then transmitted via an antenna.

Unfortunately, some converter structures are susceptible to "glitches" and other timing imperfections as well as leakage from other antennas or the local oscillator (LO). For example, an existing impairment of a capacitive DAC (C-DAC) is LO leakage, in which due to different processing mechanisms, the LO leakage leaks into the transmitted signal. Compensation or correction of the LO leakage to the baseband signal thus becomes desirable.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a circuit, a processor, a process running on a processor, a controller, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies, signed local oscillator (LO) leakage of a signed radio frequency digital-to-analog converter (RFDAC) can be reduced or eliminated according to various aspects disclosed. An RFDAC operates to convert a digital signal (e.g., a multi-bit signal) to an analog signal. The number of bits present in the digital signal can correspond to a number of discrete values between which the analog signal varies—the greater the number of bits present, the larger the number of discrete values for the analog signal, for example. Thus, by varying the input signal supplied to the RFDAC, analog signals output by the DAC can vary as analog signals according to their analog character. Further, the RFDAC (e.g., an I/Q RFDAC) together with an IQ modulator or transmitter device operates to upconvert base band signals to a radio frequency band once these signals have been modulated by a carrier frequency via the LO. Compensation or correction of the LO leakage to the baseband signal is desirable, and in particular where signed LO leakage has an effect on the desired signal.

In particular with an RFDAC, different LO leakage signals can be detected that comprise signed LO leakage and also unsigned leakage along a signal processing path of a transmitter, in which the sign or signed differences can be an indication of a polarity, a direction (e.g., a positive signal or a negative signal, a non-inverted signal or an inverted signal), or a value that is negative or positive, for example. Although RFDACs (e.g., capacitive DACs (C-DAC) or other RFDACs) can sometimes only be able to up-convert positive signals, for a use of the RFDAC in an IQ modulator, for example, the signals can also be negative. Therefore, in case of negative signal values, the negative sign can be applied by inverting the LO signal before up-conversion. This can mean that the LO signal can be modulated by the sign value of the baseband signal, and then fed to the input of the RFDAC. In case of a large instantaneous phase modulation change, the LO can be inverted, which can correspond to approximately a 180° phase change and can be subtracted from the large change of the phase modulation signal. Thus, effectively the RFDAC could not detect or sense a different LO signal depending on the "sign" value of this mode, except for any unwanted effects because of the LO inversion (e.g., effects on the LO path).

In some embodiments, a mobile device or communication device can comprise an RFDAC coupled to a signal processing path from an RF front end of a communication device (e.g., a mobile or wireless device, user equipment or the like) that compensates, suppresses, cancels, reduces or eliminates the local oscillator (LO) leakage, which can be present at an output of the RFDAC. The LO leakage can include a signed LO leakage and an unsigned LO leakage, which can also vary and be independently, unrelated to one another in absolute value or sign value.

Two different components along the signal processing paths to the RFDAC can operate to separately or independently suppress the LO leakage experienced at the DAC, such as an unsigned LO suppression component and a signed LO suppression component, which can operate at a different locations along the signal processing chain/path. The unsigned LO leakage suppression component can generate a suppression/cancelation of the LO leakage that is applied to the baseband signal before a split of the signal processing path into a magnitude branch and a sign branch to eliminate the unsigned LO leakage. In addition, the signed LO leakage suppression component can generate a further suppression/cancelation that is applied after the split to eliminate signed LO leakage of the LO leakage. Both of these LO leakage components (unsigned/signed LO leakage components), can operate to suppress the signed LO signed leakage and the unsigned LO leakage independently or separately from one another.

LO leakage can thus have two components, an unsigned LO leakage that originates from the original LO generation, which leaks directly to the RFDAC output, and a signed LO leakage which originates after mixing the sign signal(s) of a sign signal branch with the LO signal(s) (in-phase carrier signal and quadrature carrier signal), and leaks after this mixing into the RFDAC output. As intended herein, up-conversion in RFDACs can be related to the baseband signal. The LO leakage, for example, is suspected to occur within the RFDAC. The sign-mixed LO signals fed to the RFDAC cells for conversion to from digital to analog can be due to physical proximity, in which the (signed) LO signal can leak into the RFDAC output. It is not excluded, that there might be other ways for this leakage (both signed and unsigned LO leakage), but the RFDAC itself can be considered a main source of the leakage. A signed LO leakage can vary from an unsigned LO leakage where the "sign" value of the leakage can vary and the leakage can be bi-polar. Additional aspects and details of the disclosure are further described below with reference to figures.

Figure 1:
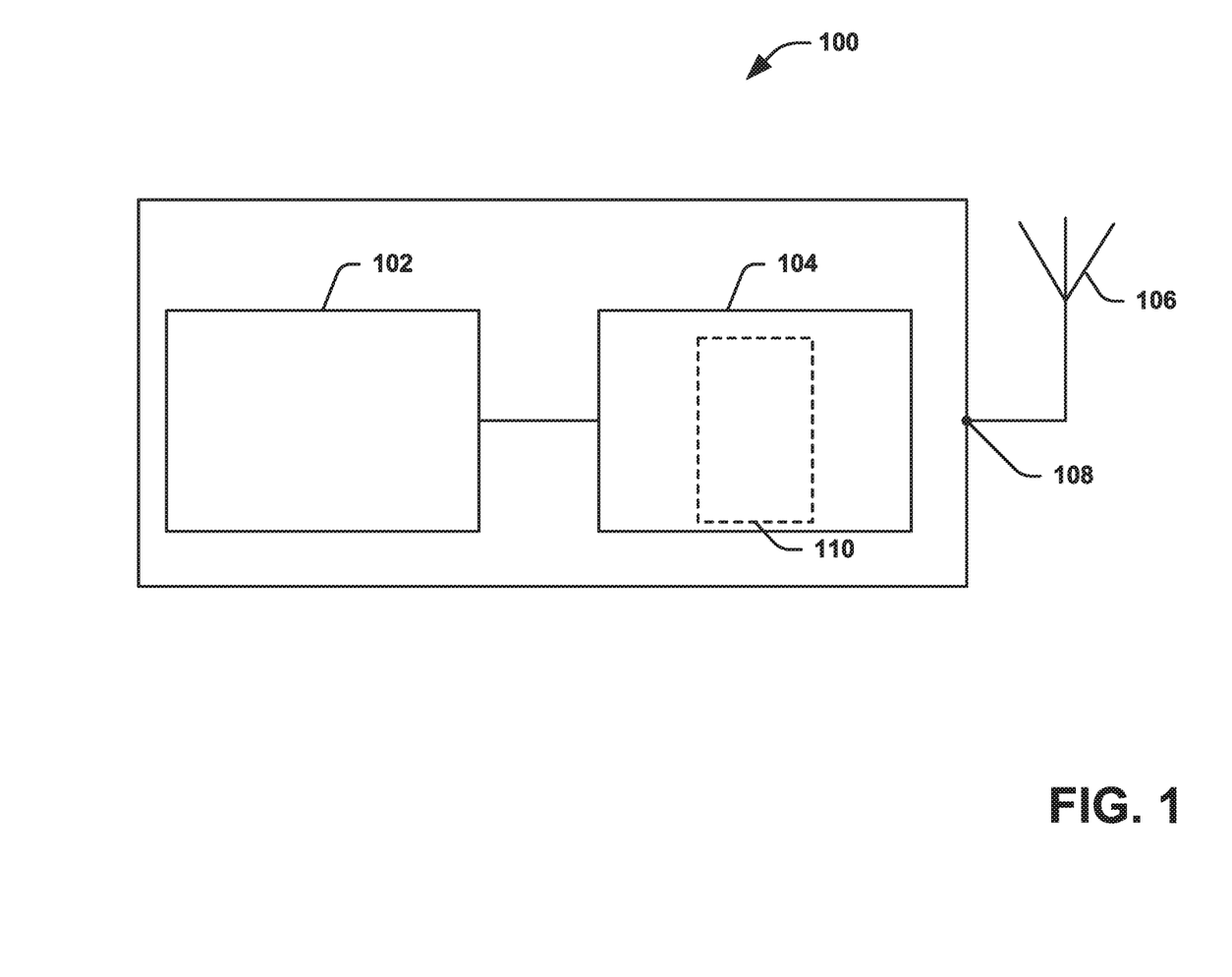
FIG. 1 illustrates an exemplary communication system in accordance with various aspects.

Referring to FIG. 1, illustrated is an example communication device or I/Q modulator system 100 that can operate for in-phase/quadrature (I/Q) modulation in accordance with various aspects being disclosed. The communication device 100, for example, comprises a digital baseband processor 102, an digital frontend 104 and an antenna port 108 for connecting to an antenna 106. The mobile communication device 100 can comprise an exemplary RFDAC or IQ modulator 110 as part of or coupled to the digital frontend 104. Nevertheless, it is also possible that each of the digital baseband processor 102 and the digital frontend 104 comprises such a RFDAC in or coupled to an I/Q modulator 110 or RFDAC system. The digital frontend 104 is coupled to the digital baseband processor 102 and the antenna port 108.

The RFDAC 110 can include an architecture and function of any particular kind of RFDAC, such as a current-DAC (or I-DAC), a resistance-DAC (or R-DAC), as well as the capacitive DAC (or C-DAC), or can be a part of a polar modulator device or system as well. Because of its advantages over other DACs, the C-DAC can be used in many cellular products or communication devices. Although C-DACs can sometimes only be able to up-convert positive signals. For a usage of the RFDAC 110 in an IQ modulator system 100, for example, the signals can also be negative. Therefore, in case of negative signal values, the negative sign can be applied by inverting the LO signal before up-conversion. This can mean that the LO signal can be modulated by the sign value of the baseband signal, and then fed to the input of the C-DAC. A polar modulator generally does not need this operation, but also for this architecture a "signed" mode has been introduced. Nevertheless, the signed polar mode only addresses the generation of the modulated LO signal. In case of a large instantaneous phase modulation change, the LO can be inverted, which corresponds to approximately a 180° phase change and can be subtracted from the large change of the phase modulation signal. Thus, effectively the RFDAC 110 does not see or detect a different LO signal depending on the "sign" value of this mode, except for being affected by unwanted effects because of the LO inversion (e.g., by effects on the LO path).

In particular, an existing impairment of the C-DAC is LO leakage, which can be due to different mechanisms such as electromagnetic or load coupling, asymmetry in differential structure or other imperfections. As a result, the LO signal leaks into the transmitted signal or the output of the C-DAC. The LO leakage, however, can comprise an unsigned LO leakage as well as a signed LO leakage. For the unsigned C-DAC (or other transmitter architectures), the LO leakage can be corrected by adding a DC offset to the baseband signal. However, the unsigned LO leakage also can be addressed independently of the signed leakage. For example, the signed LO leakage can be problematic when the LO signal, which is multiplied with the sign signal, leaks into output signal. Unlike the unsigned leakage the signed LO leakage cannot be corrected without further configuration. For this reason, suppression of the signed LO leakage is crucial in order to achieve 3GPP requirements for both IQ and polar modulators.

Figure 2:
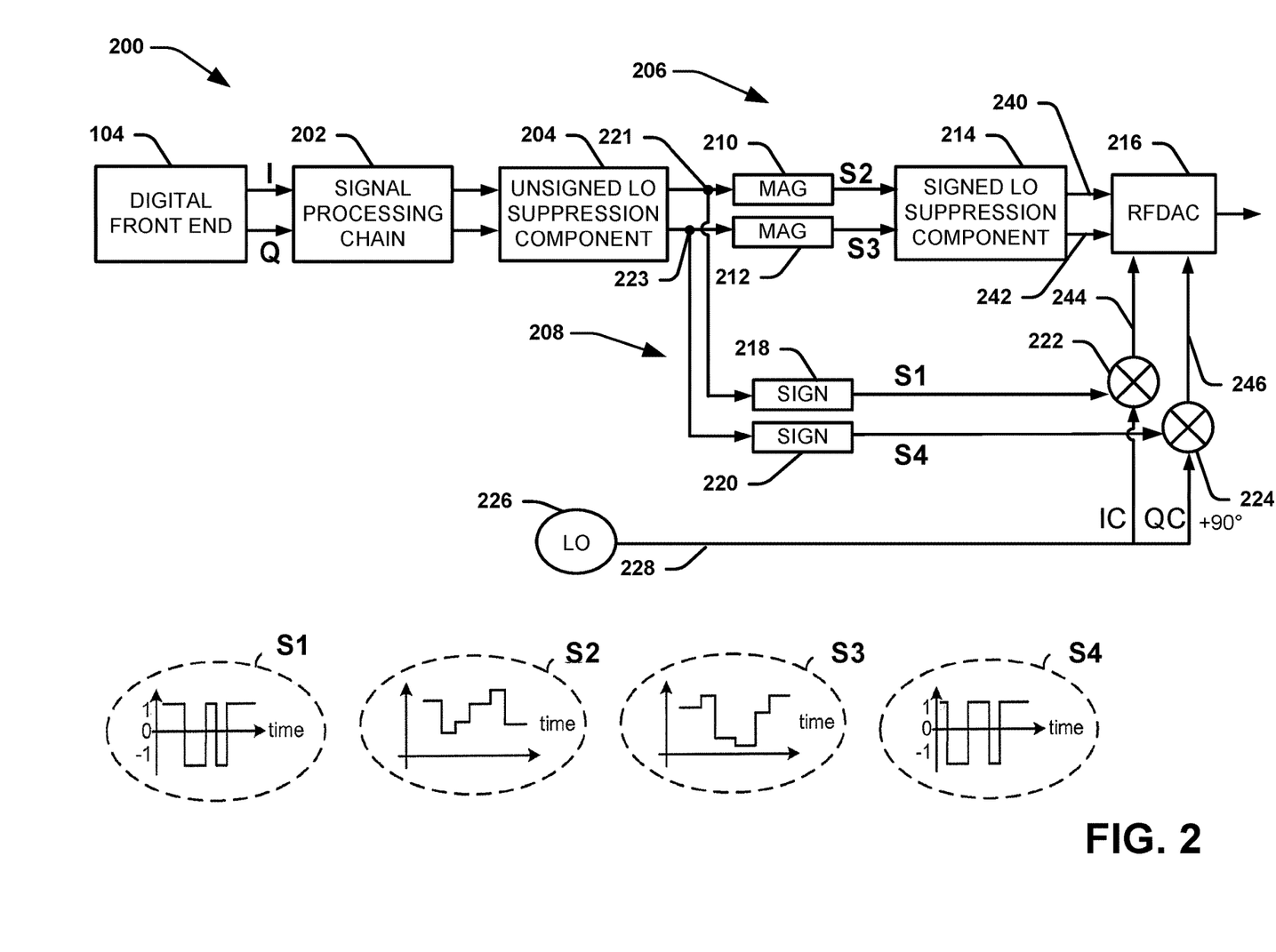
FIG. 2 illustrates a block diagram of another communication system that includes an improved converter or RFDAC device in accordance with various aspects.
Figure 3:
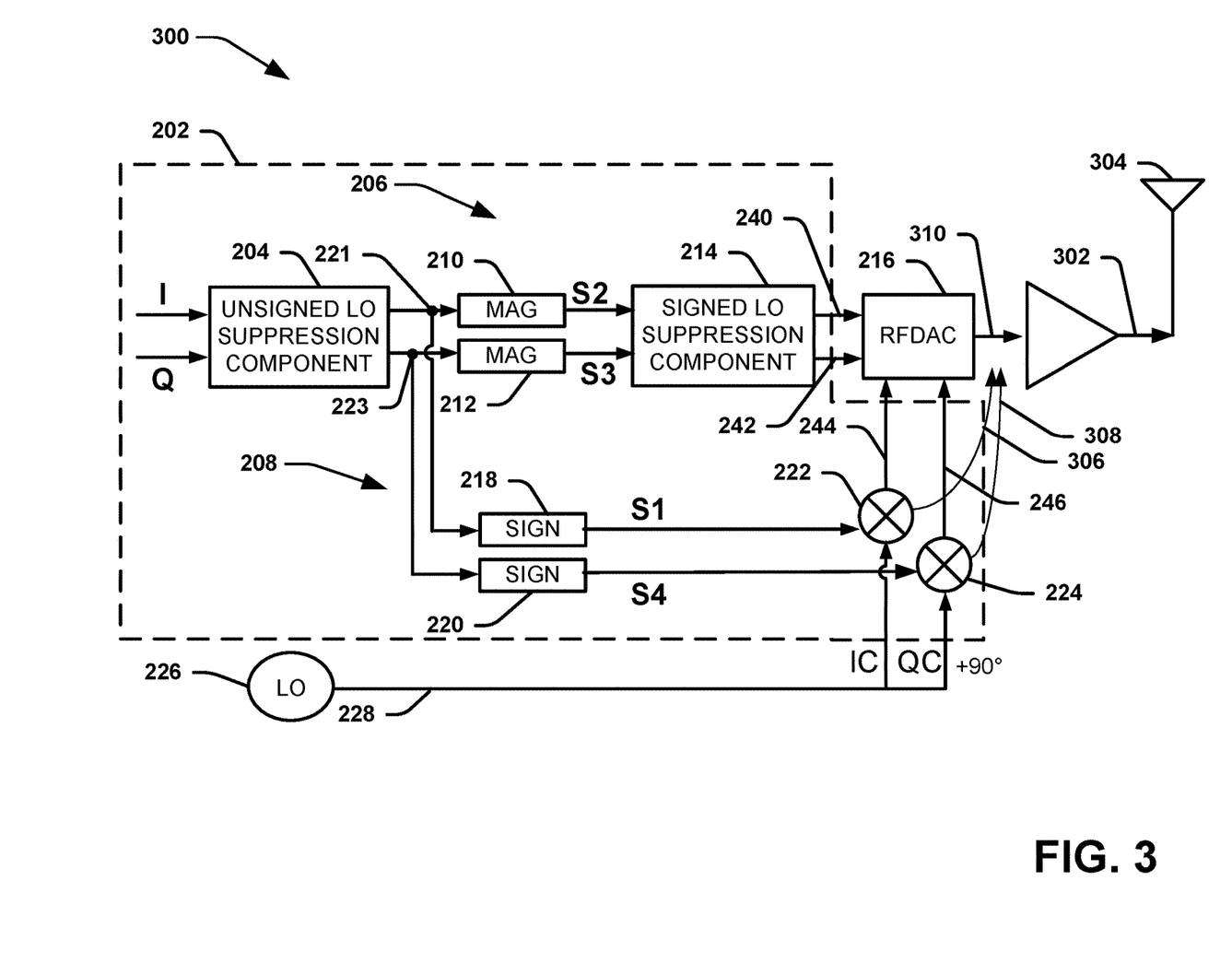
FIG. 3 illustrates a block diagram of another communication system that includes an improved converter or RFDAC device in accordance with various aspects.

FIG. 2 illustrates an example modulator or RFDAC system 200 that suppresses or eliminates LO leakage, both signed LO leakage and unsigned LO leakage, in accordance with various embodiments. The RFDAC system 200 can be a portion of a transceiver or a transmitter in one or more implementations. The RFDAC system 200 comprises a signal processing chain 202 coupled to the baseband or digital front end 104. The signal processing chain 202 can include one or more components along an in-phase (I) path and a quadrature (Q) path for signal processing, such as, but not limited to, a digital pre-distortion component, a fractional sample rate conversion component, digital filters or the like. Although the signal processing chain 202 is illustrated as a block between the digital front end 104 and the unsigned LO suppression component 204, the signal processing chain 202 can include the unsigned LO suppression component 204, the magnitude components 210, 212, the signed LO suppression component 214, the sign components 218, 220, the mixers 222, 224 or inputs 240-246 to the RFDAC 216 as illustrated in FIG. 3, for example. The signal processing chain 202 provides the processed digital baseband signal to downstream I paths and Q paths to the unsigned LO suppression component 204 and can also be considered as including the I and Q paths to the RFDAC, including the magnitude branch 206 and the sign branch 208.

The unsigned LO suppression component 204 can receive the I and Q paths and operates to eliminate or suppress the signed LO leakage within or as part of the signal processing chain 202 by providing an offset. The unsigned LO suppression component 204 can operate to provide the offset, for example, as a DC bias to the digital baseband signal of the I and Q paths leading to the RFDAC 216. Due to different mechanisms such as an electromagnetic or load coupling, asymmetry in the differential structure or other imperfections, the LO signal can leak into the transmitted signal coming from the RFDAC 216, for example. The unsigned LO suppression component 204 can suppress this signed LO leakage and correct the baseband signal from unwanted defects during or after up-conversion by adding a DC offset or bias current to the baseband signal.

The DC bias to eliminate or correct for the unsigned LO leakage can be provided by the unsigned LO suppression component 204 before split nodes 220 and 222. The split nodes 221 and 223 operate to split the signal processing chain 202 into different paths, the magnitude branch 206 of the signal processing chain 202 and the sign branch 208 of the signal processing chain 202. The magnitude branch 206 is coupled to or within the signal processing chain at the split node(s) 221, 223 and to the RFDAC 216 at an in-phase magnitude input 240 and a quadrature magnitude input 242. The magnitude branch 206 comprises an in-phase magnitude path S2 configured to provide an in-phase magnitude signal to an in-phase magnitude input 240 of the RFDAC 216, and a quadrature magnitude signal path S3 configured to provide a quadrature magnitude signal to a quadrature magnitude input 242 to the RFDAC 216. The signals S2 and S2 can be digital signals having the DC bias provided via the unsigned LO suppression component 204, for example.

A sign branch 208 can be coupled to the signal processing chain 202 at the split nodes 221, 223 and to the RFDAC 216 also. The sign branch 208 of the signal processing chain 202 can include an in-phase sign path S1 configured to provide an in-phase sign signal to an in-phase sign input 244 of the RFDAC 216 after being mixed at mixer 222 with a local oscillator carrier signal from the local oscillator 226 via path 228. The sign branch 208 further includes a quadrature sign path S4 configured to provide a quadrature sign signal to a quadrature sign input 246 to the RFDAC 216 after being mixed at mixer 224 with a local oscillator carrier signal from the local oscillator 226 via path 228. The mixer 224 can be offset by a predetermined phase shift (e.g., 90 degrees or the like). The sign branch 208 further includes sign components 218 and 220 that generate corresponding digital sign signals as the in-phase sign signal and the quadrature sign signal, respectively, of the base band signal.

As part of up-conversion processes with the sign branch signals along S1 and S4 pathways, signed LO leakage can be prone to affect the output of RFDAC 216, in which the carrier signal leaks through to the output and can result in an increase of power spectral density at a carrier position. Thus, the local oscillator 226 generates a local carrier signal along with unsigned LO leakage and signed LO leakage, which are different components of LO leakage affecting the RFDAC 216 output. In response to the LO 226 signal, an in-phase carrier signal (IC) and a quadrature carrier signal (QC) can be generated. The LO signals IC and QC can be modulated with, multiplied with or inverted based on the sign signals along S1 and S4. As intended herein, a meaning of up-conversion when speaking about RFDACs can be related to the baseband signal. The LO leakage, for example, is suspected to occur within the RFDAC 216. The sign-mixed LO signals along inputs 244 and 246 can be fed to the RFDAC 216 cells and due to physical proximity, the (signed) LO signal can leak into the output. It is not excluded, that there might be other ways for this leakage (both signed and unsigned LO leakage), but the RFDAC 216 itself can be the main source of the leakage.

Both the magnitude branch 206 and the sign branch 208 can thus receive the baseband signal with a first DC offset to correct for the unsigned leakage via the unsigned LO suppression component 204 operating on the I and Q paths before the split node or nodes 221, 223. However, the signed LO leakage can be compensated via the signed LO suppression component 214, which is coupled to the magnitude components 210 and 212 and to the in-phase and quadrature magnitude inputs 240, 242 of the RFDAC 216. The signed LO suppression component 214 can operate to add an offset to the magnitude branch 306 downstream of the split nodes 221, 223 and to both in-phase and quadrature magnitude paths S2 and S3.

Thus, the unsigned LO suppression component 204 and the signed LO suppression component 214 can achieve suppression of both types of LO leakage, both signed and unsigned LO leakage at the output of the RFDAC 216. For example, to suppress the unsigned LO leakage a small offset can be added such as a different or similar DC bias to the magnitude signal of the I and Q paths of the magnitude branch 306. Bit widths and DC bias corresponding thereto can vary depending on the baseband signal and be independent and unrelated to the DC bias of the unsigned LO suppression component 304, for example.

The RFDAC 216 thus receives the digital in-phase magnitude signal S2 from the signed LO suppression component 214 at input 240, and a mixed in-phase sign signal at input 244. Similarly, the RFDAC 216 can receive the digital quadrature magnitude signal S3 from signed LO suppression component 214 at input 242, and a mixed quadrature sign signal at input 246. The RFDAC 216 can then utilized these signals to generate an output to a driver 302, for example to one or more antennas 304 as illustrated in FIG. 3. The RFDAC system 200 enables, not only positive (i.e., single polarity) signals to be input to and converted by the RFDAC 216, but also signals of bi-polarity that can take into account LO leakage of both sign and unsigned LO leakage.

Referring to FIG. 3, illustrated is another example RFDAC or IQ modulator system 300 that cancels signed and unsigned LO leakage in accordance with various embodiments. The LO leakage 306 and 306 of both in-phase and quadrature phase sign paths after having been mixed in up-conversion with LO signals at different phases by mixers 222 and 224 can be shown having effects at the RFDAC output 310, for example. Here, the LO leakage is applied to part of the sign after the LO 226, but it is also possible that leakage can occur from the original LO 226 generation to the output, in which this is considered unsigned LO leakage In an embodiment, the signal processing chain 202 can also be seen as comprising the unsigned LO suppression component 204, the magnitude components 210, 212, the signed LO suppression component 214, the sign components 218, 220, the mixers 222, 224 or inputs 240-246 to the RFDAC 216. The signal processing chain 202 provides the processed digital baseband signal to downstream I paths and Q paths to the unsigned LO suppression component 204 and can also be considered as including the I and Q paths to the RFDAC, including the magnitude branch 206 and the sign branch 208 along with the signed LO suppression component 214, for example. Other components for signal processing can also be included as one of ordinary skill in the art could appreciate.

Figure 4:
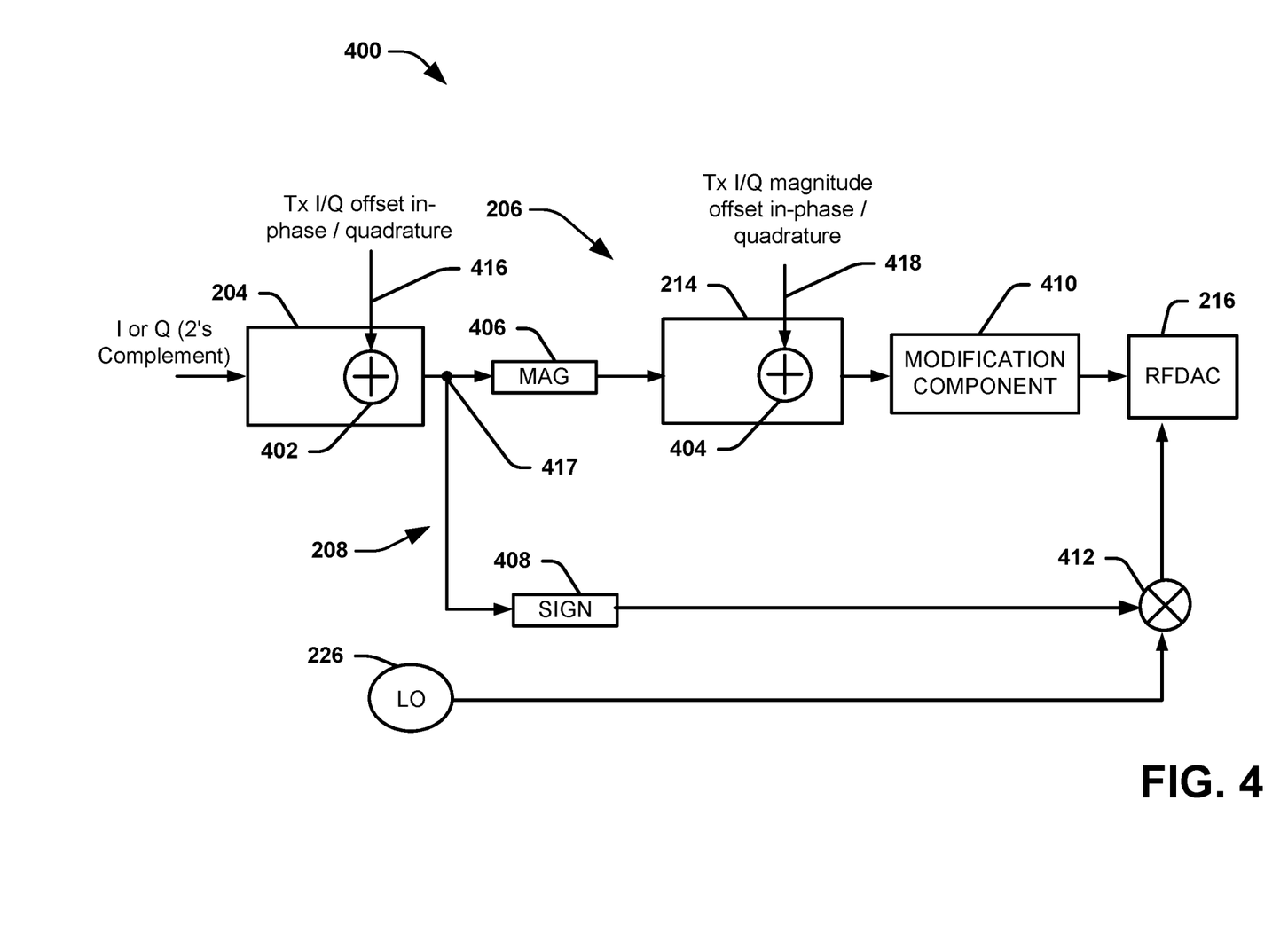
FIG. 4 illustrates a block diagram of another communication system that includes an improved converter or RFDAC device in accordance with various aspects.

Referring to FIG. 4, illustrated is an example RFDAC system 400 with suppression components 204 and 214 for suppression of unsigned and signed LO leakage. The unsigned leakage can be generated along the different branches 206 and 208 and the signed leakage can be generated along the sign branch 208 as a result of up-conversion of the sign signals with the LO 226. The LO 226 is also used for up-conversion, but the baseband signal that gets up-converted is an absolute value of the original non-complex signal. This sign 408 that was extracted at the original baseband signal can be included in the LO 226 sign, giving a signed LO signal. Thus, this signed LO can also leak through in up-conversion, thereby affecting the RFDAC 216 output.

For a usage of the RFDAC 216 in an IQ modulator the signals can also be negative. Therefore, in case of negative signal values, the negative sign can be applied by inverting the LO signal before up-conversion. This means that the LO signal needs to be modulated by the sign value 408 of the baseband signal, and then this sign value can be fed to the input of the RFDAC 216 via a mixer 412. A polar modulator generally does not need this operation, but also for this architecture a "signed" mode or branch 208 can be present. Nevertheless, the signed polar mode only addresses the generation of the modulated LO signal. In case of a large instantaneous phase modulation change the LO signal can be inverted, which corresponds to a 180° phase change, and can then be subtracted from the large change of the phase modulation signal. So effectively the RFDAC 216 could not see a different LO signal depending on the "sign" value of this mode, except any unwanted effects because of the LO inversion (effects on the LO path).

Here, the IQ RFDAC 216 can be used in a similar way for the polar RFDAC. The sign switching in the signed polar DAC could have no effect on LO leakage, except the LO path (LO inverter) it could have influence. Then separate cancelation offsets dependent on the sign mode could be useful. The unsigned LO suppression component 204 can include at least one of an adder 402 or a register memory (not shown), in which a command can be received or control signal of predefined or variable bit width indicating the amount or width of the offset to be applied for a given in-phase or quadrature path independently. The control signal (Tx I/Q offset in-phase/quadrature) 416 can specify or indicate the DC bias to provide at the adder 402 for offsetting the unsigned LO leakage, for example. The control signal (Tx I/Q offset in-phase/quadrature) 416 can be varied depending on a signal from a control component or the modification component 410, in which the bias can be a DC bias or current, for example.

The split node 417 separates the digital baseband signal after the unsigned LO suppression component 204 and a sign component 408 determines or generates a sign signal (e.g., an in-phase sign signal and a quadrature sign signal) to the mixer 412, which introduces with the LO signal to the sign signal for a mixed carrier sign signal to the RFDAC 216. The magnitude branch 206 includes a magnitude component 406 that determines or generates a magnitude signal with a magnitude value of the baseband signal.

The signed LO suppression component 214 can generate an offset that is independent of the offset generated by the unsigned LO suppression component 204. The signed LO suppression offset generated can be independently varied in a DC bias that can be added to the (in-phase or quadrature) magnitude signal via the adder 404, for example. This bias can be changed based on the control signal 418 being received. The modification component 410, in one example, can modify the output by changing the bias indicated by the control signal, similarly to the control signal 416 based on whether the baseband signal is positive or negative. Both of which can be independent of one another with different values being provided to the magnitude signal.

In one embodiment, the sign of the baseband signal determined by the modification component 410 could not only provide or generate a bias before the magnitude (absolute) function at the magnitude component 406 (in conjunction with or as a source for one or more of the LO leakage suppression components 416, 418), but alternatively or additionally generate different biases based on positive and negative values of the baseband.

Alternatively or additionally, the modification component 410 can generate a common bias that can be provided for both LO leakage suppression components 416, 418 and then a specific add on for positive or negative values, which can be merged with an inversion function that could also be generated at the modification component 410 to invert magnitude signals along the magnitude branch 206. In particular, if a 2-complement for negative numbers is provided, or an inversion, this could also be substituted by subtracting the value from the bias at the signed LO suppression component 214, for example. As such, values can be added or subtracted at the biases instead of adding or subtracting a sine wave.

As such, the offset or DC bias by the unsigned LO suppression component 204 can comprise an unmodified common bias, and the other or second offset or DC bias provided to the magnitude branch 206 by the signed LO suppression component 414 can be modified by either applying 2's complement, or adding another value to the common bias via the modification component 410, for example. The common bias then represents the sum of unsigned LO leakage and the signed LO leakage for positive signal values, and the modified common bias can represent the signed LO leakage cancelation for negative signal values.

Another alternative embodiment, includes the LO suppression components utilizing a defined DC bias for unsigned LO leakage cancelation and two separate values for signed LO leakage cancelation (one for each polarity of the baseband signal), which can both be applied on the baseband signal, and not on the magnitude path after the split. All offsets—unsigned LO leakage, signed LO leakage for positive signal values and signed LO leakage for negative signal values—can be independent and not necessarily related to one another, but rather be independently controlled (e.g., via the modification component 410 or other controller/processor device).

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 5:
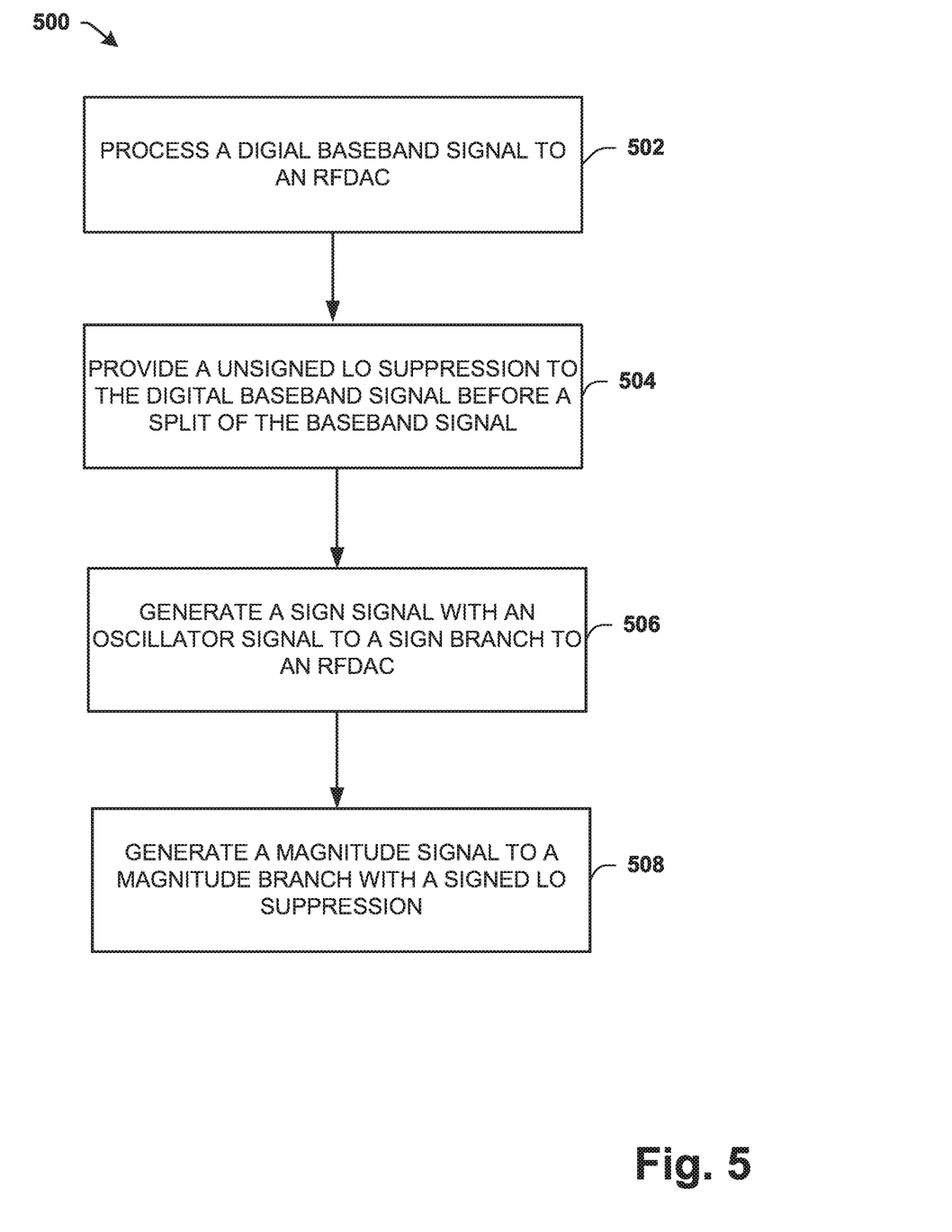
FIG. 5 illustrates a flow diagram of a method for a communication system in accordance with various aspects described.

Referring to FIG. 5, illustrated is a method 500 for suppression of signed and unsigned LO leakage from an oscillator in an RFDAC (e.g., a CDAC or RDAC). At 502, a digital baseband signal can be processed in a transmitter or other communication devices and provided to an RFDAC (e.g., RFDAC 216), such as by a 2's complement with in-phase or quadrature signal paths. Here, the method 500 can include receiving the baseband signal at an input of a signal processing chain 202 of a radio frequency digital-to-analog converter (RFDAC) 216 to up-convert the baseband signal to a radio frequency, and convert the baseband signal to an analog signal along a transmission path (e.g., output arrow from RFDAC 216).

At 504, an unsigned LO suppression signal (e.g., a DC bias) can be generated and provided to the digital baseband signal prior to a split of the signal processing chain such as at a split node. A carrier signal can be provided via a local oscillator to the baseband signal for processing to the analog signal and that also generates an LO leakage comprising a signed LO leakage and the unsigned LO leakage.

At 506, a sign signal can be generated along a sign branch that is mixed at a mixer with a local oscillator signal and upconverted to an radio frequency or RF frequency at the RFDAC. At 508, a magnitude signal can be generated along a magnitude branch along with a signed LO suppression offset or bias being provided after the split and to the magnitude branch to suppress or cancel/eliminate the signed LO leakage at the RFDAC. The unsigned LO leakage can be eliminated from the baseband signal via an unsigned LO leakage suppression component, while the signed LO leakage can be eliminated independently of the unsigned LO leakage via a signed LO leakage suppression component.

In one embodiment, the method 500 can further include providing a magnitude signal component of the baseband signal via a magnitude component along a magnitude signal branch and a sign signal component of the baseband signal via a sign component along a sign signal branch in parallel to the magnitude signal branch, respectively, to the RFDAC. Suppressing the signed LO leakage suppression via the signed LO leakage suppression component can also include providing an offset located within the magnitude signal branch of the signal processing chain and the suppressing the unsigned leakage suppression via the unsigned LO leakage suppression component comprising providing another offset located along the signal processing chain before the magnitude signal branch and the sign signal branch.

The method 500 can also include providing an in-phase magnitude signal to the RFDAC along an in-phase magnitude branch and a quadrature magnitude path of the magnitude signal branch to the RFDAC. An in-phase sign path of the sign signal branch can also provide an in-phase sign signal to a first mixer coupled to the RFDAC and the local oscillator, and a quadrature sign signal along a quadrature sign path to a second mixer coupled to the RFDAC and the local oscillator.

The unsigned LO leakage suppression component (e.g., 214) can provide a first offset to the signal processing chain, and providing an output along a magnitude signal branch and a sign signal branch that splits from the signal processing chain at a split node. The signed LO leakage suppression component is configured to receive an input signal along the magnitude signal branch and provide a second offset to a second output along the magnitude signal branch that provides a magnitude signal to the RFDAC.

Figure 6:
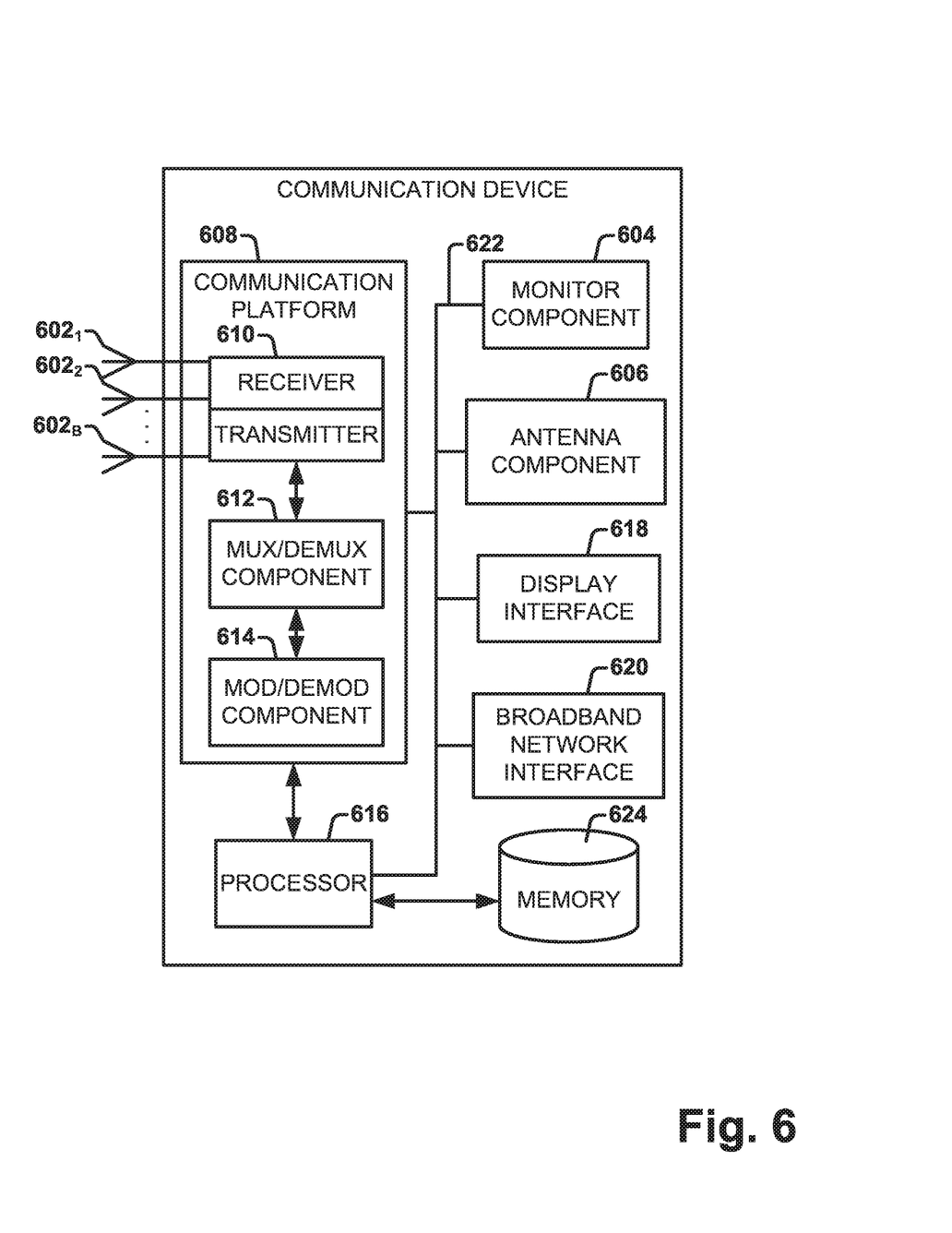
FIG. 6 illustrates an exemplary communication device having a converter or communication system in accordance with various aspects described.

To provide further context for various aspects of the disclosed subject matter, FIG. 6 illustrates a block diagram of an embodiment of access (user) equipment or a communication system related to access of a network (e.g., base station, wireless access point, femtocell access point, and so forth) that can enable or exploit embodiments or aspects disclosed herein.

Access equipment, UE and/or software related to access of a network can receive and transmit signal(s) from and to wireless devices, wireless ports, wireless routers, etc. through segments $602_1$-$602_B$ (B is a positive integer). Segments $602_1$-$602_B$ can be internal and/or external to access equipment and/or software related to access of a network, and can be controlled by a monitor component 604 and an antenna component 606. Monitor component 604 and antenna component 606 can couple to communication platform 608, which can include electronic components and associated circuitry that provide for processing and manipulation of received signal(s) and other signal(s) to be transmitted. The communication platform can encompass or comprise the RFDAC systems disclosed herein.

In an aspect, communication platform 608 can further include a receiver/transmitter 610 that can convert analog signals to digital signals upon reception of the analog signals, and can convert digital signals to analog signals upon transmission, as discussed in embodiments herein. In addition, receiver/transmitter 610 can divide a single data stream into multiple, parallel data streams, or perform the reciprocal operation. Coupled to receiver/transmitter 610 can be a multiplexer/demultiplexer 612 that can facilitate manipulation of signals in time and frequency space. Multiplexer/demultiplexer 612 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 612 can scramble and spread information (e.g., codes, according to substantially any code known in the art, such as Hadamard-Walsh codes, Baker codes, Kasami codes, polyphase codes, and so forth).

A modulator/demodulator 614 is also a part of communication platform 608, and can modulate information according to multiple modulation techniques, such as frequency modulation, amplitude modulation (e.g., M-ary quadrature amplitude modulation, with M a positive integer); phase-shift keying; and so forth).

Access equipment and/or software related to access of a network also includes a processor 616 configured to confer, at least in part, functionality to substantially any electronic component in access equipment and/or software. In particular, processor 616 can facilitate configuration of access equipment and/or software through, for example, monitor component 604, antenna component 606, and one or more components therein. Additionally, access equipment and/or software can include display interface 618, which can display functions that control functionality of access equipment and/or software or reveal operation conditions thereof. In addition, display interface 618 can include a screen to convey information to an end user. In an aspect, display interface 618 can be a liquid crystal display, a plasma panel, a monolithic thin-film based electrochromic display, and so on. Moreover, display interface 618 can include a component (e.g., speaker) that facilitates communication of aural indicia, which can also be employed in connection with messages that convey operational instructions to an end user. Display interface 618 can also facilitate data entry (e.g., through a linked keypad or through touch gestures), which can cause access equipment and/or software to receive external commands (e.g., restart operation).

Broadband network interface 620 facilitates connection of access equipment and/or software to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 620 can be internal or external to access equipment and/or software and can utilize display interface 618 for end-user interaction and status information delivery.

Processor 616 can be functionally connected to communication platform 608 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 616 can be functionally connected, through data, system, or an address bus 622, to display interface 618 and broadband network interface 620, to confer, at least in part, functionality to each of such components.

In access equipment and/or software memory 624 can retain location and/or coverage area (e.g., macro sector, identifier(s)) access list(s) that authorize access to wireless coverage through access equipment and/or software sector intelligence that can include ranking of coverage areas in the wireless environment of access equipment and/or software, radio link quality and strength associated therewith, or the like. Memory 624 also can store data structures, code instructions and program modules, system or device information, code sequences for scrambling, spreading and pilot transmission, access point configuration, and so on. Processor 616 can be coupled (e.g., through a memory bus), to memory 624 in order to store and retrieve information used to operate and/or confer functionality to the components, platform, and interface that reside within access equipment and/or software.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus of a mobile communication device comprising: an radio frequency (RF) frontend; a radio frequency digital-to-analog converter (RFDAC) configured to up-convert a digital baseband signal to a radio frequency, and convert the digital baseband signal from a signal processing chain to an analog signal, wherein the RFDAC is coupled to a local oscillator configured to provide an oscillator signal to the digital baseband signal of the signal processing chain, and generate a local oscillator (LO) leakage comprising a signed LO leakage and an unsigned LO leakage at an output of the RFDAC; an unsigned local oscillator LO leakage suppression component configured to suppress the unsigned LO leakage from the digital baseband signal; and a signed LO leakage suppression component configured to suppress the signed LO leakage.

Example 2 includes the subject matter of Example 1, including or omitting optional elements, wherein the unsigned LO leakage suppression component is configured to provide a first offset at a first location along the signal processing chain, and the signed LO leakage suppression component is further configured to provide a second offset at a second location along the signal processing chain to the RFDAC to suppress the signed LO leakage separately or independently from the unsigned LO leakage.

Example 3 includes the subject matter of any one of Examples 1-2, including or omitting optional elements, further comprising: a magnitude component, coupled between magnitude branch of the signal processing chain and the RFDAC, configured to receive the digital baseband signal at a split node of the signal processing chain and generate a magnitude signal of the digital baseband signal along the magnitude branch to the RFDAC; and a sign component, coupled between a sign branch of the signal processing chain and the RFDAC, configured to receive the digital baseband signal at the split node and generate a sign signal of the digital baseband signal along the sign branch to the RFDAC.

Example 4 includes the subject matter of any one of Examples 1-3, including or omitting optional elements, wherein the signed LO leakage suppression component is coupled between the magnitude component and the RFDAC after a split of the digital baseband signal into the magnitude signal of the magnitude branch and the sign signal of the sign branch, and the unsigned LO leakage suppression is coupled between the signal processing chain and the split node before the splitting of the digital baseband signal into the magnitude signal of the magnitude branch and the sign signal of the sign branch.

Example 5 includes the subject matter of any one of Examples 1-4, including or omitting optional elements, wherein the unsigned LO leakage suppression component is further configured to receive the digital baseband signal and generate a first offset in the signal processing chain to suppress the unsigned LO leakage, and the signed LO leakage suppression component is further configured to receive a magnitude signal component of the digital baseband signal and generate a second offset in the signal processing chain to suppress the signed LO leakage from the magnitude signal component.

Example 6 includes the subject matter of any one of Examples 1-5, including or omitting optional elements, wherein the first offset comprises a common bias and the second offset comprises a modification of the common bias by a modification component configured to modify the second offset by a mathematical operation based on whether the magnitude signal component is a negative value or a positive value.

Example 7 includes the subject matter of any one of Examples 1-6, including or omitting optional elements, wherein the unsigned LO leakage suppression component is further configured to generate the first offset independently from the second offset generated from the signed LO leakage suppression component, and the signed LO leakage suppression component with the modification component is configured to generate different second offsets based on whether the magnitude signal component comprises the negative value or the positive value, wherein the first offset and the different second offsets.

Example 8 includes the subject matter of any one of Examples 1-7, including or omitting optional elements, wherein the unsigned LO leakage suppression component provides an output signal to a magnitude branch and a sign branch that are arranged in parallel to one another and coupled to inputs of the RFDAC, wherein the magnitude branch is configured to generate an absolute value signal of the digital baseband signal and the sign branch is configured to generate a sign value signal to a mixer component.

Example 9 includes the subject matter of any one of Examples 1-8, including or omitting optional elements, wherein the mixer component, coupled to the local oscillator and the RFDAC, is configured to mix the sign value signal with a local oscillator signal of the local oscillator and provide an output to the RFDAC concurrent to the magnitude branch providing the absolute value signal to the RFDAC.

Example 10 includes the subject matter of any one of Examples 1-9, including or omitting optional elements, wherein the signal processing chain comprises a quadrature path and an in-phase path coupled to a plurality of magnitude component inputs to the RFDAC and a plurality of sign component inputs to the RFDAC.

Example 11 is A system of a mobile communication device comprising: a signal processing chain; a radio frequency digital-to-analog converter (RFDAC) coupled to the signal processing chain and configured to receive a baseband signal from the signal processing chain, up-convert the baseband signal to a radio frequency, and convert the baseband signal to an analog signal along a transmission path; a local oscillator configured to provide a carrier signal to the baseband signal to the analog signal to generate a local oscillator (LO) leakage comprising a signed LO leakage and an unsigned LO leakage; a unsigned LO leakage suppression component, configured to suppress the unsigned LO leakage from the baseband signal; and a signed LO leakage suppression component configured to suppress the signed LO leakage.

Example 12 includes the subject matter of Example 11, including or omitting optional elements, further comprising a magnitude signal branch and a sign signal branch in parallel to the magnitude signal branch, configured to provide a magnitude signal component of the baseband signal via a magnitude component and a sign signal component of the baseband signal via a sign component, respectively, to the RFDAC.

Example 13 includes the subject matter of any one of Examples 11-12, including or omitting optional elements, wherein the signed LO leakage suppression component is located within the magnitude signal branch of the signal processing chain and the unsigned LO leakage suppression component is located along the signal processing chain before the magnitude signal branch and the sign signal branch.

Example 14 includes the subject matter of any one of Examples 11-13, including or omitting optional elements, wherein the magnitude signal branch comprises an in-phase magnitude path configured to provide an in-phase magnitude signal to the RFDAC and a quadrature magnitude path configured to provide a quadrature magnitude signal to the RFDAC, and wherein the sign signal branch comprises an in-phase sign path configured to provide an in-phase sign signal to a first mixer coupled to the RFDAC and the local oscillator, and a quadrature sign path configured to provide a quadrature sign signal to a second mixer coupled to the RFDAC and the local oscillator.

Example 15 includes the subject matter of any one of Examples 11-14, including or omitting optional elements, wherein the unsigned LO leakage suppression component is further configured to generate a first offset to the signal processing chain, and provide an output along a magnitude signal branch and a sign signal branch that splits from the signal processing chain at a split node, and wherein the signed LO leakage suppression component is configured to receive an input signal along the magnitude signal branch and provide a second offset to a second output along the magnitude signal branch that provides a magnitude signal to the RFDAC.

Example 16 includes the subject matter of any one of Examples 11-15, including or omitting optional elements, wherein the sign signal branch is configured to provide a sign signal component to a mixer that combines the sign signal component with a local oscillator signal and provides a combined signal to the RFDAC.

Example 17 includes the subject matter of any one of Examples 11-16, including or omitting optional elements, wherein the first offset comprises a first DC bias, and the second offset, corresponding to the signed LO leakage, comprises a second DC bias or a third DC bias based on the magnitude signal.

Example 18 includes the subject matter of any one of Examples 11-17, including or omitting optional elements, wherein the unsigned LO leakage suppression component is further configured to provide the first DC bias from a common bias, and the signed LO leakage suppression component is further configured to provide the second DC bias or the third DC bias based on a modification of the common bias by a 2's complement or an added value to suppress the signed LO leakage independently of the unsigned LO leakage, wherein the modification comprises a function of whether the baseband signal comprises a positive signal value or a negative signal value and wherein the first DC bias, the second DC bias and the third DC bias are configured independently of one another unsigned LO leakage suppression.

Example 19 is an apparatus of a communication device comprising: a signal processing chain comprising a an in-phase path configured to process an in-phase signal of a baseband signal, and a quadrature path configured to process a quadrature signal of the baseband signal; a magnitude branch, coupled to the signal processing chain at a split node and to a radio frequency digital-to-analog converter (RFDAC), comprising an in-phase magnitude path configured to provide an in-phase magnitude signal to an in-phase magnitude input of the RFDAC, and a quadrature magnitude signal path configured to provide a quadrature magnitude signal to a quadrature magnitude input of the RFDAC; a sign branch, coupled to the signal processing chain at the split node and the RFDAC, comprising an in-phase sign path configured to provide an in-phase sign signal to an in-phase sign input of the RFDAC, and a quadrature sign path configured to provide a quadrature sign signal to a quadrature sign input of the RFDAC; an unsigned LO leakage suppression component configured to suppress an unsigned LO leakage from an output of the RFDAC; and a signed LO leakage suppression component, coupled to the RFDAC, configured to suppress a signed LO leakage along the signal processing chain separately from an unsigned LO leakage.

Example 20 includes the subject matter of Example 19, further comprising: a local oscillator configured to provide a carrier signal to the sign branch to generate an analog signal at the RFDAC, and generate the signed LO leakage and the unsigned LO leakage at the output of the RFDAC in response to an up-conversion of the in-phase sign signal and the quadrature sign signal of the sign branch.

Example 21 includes the subject matter of any one of Examples 19-20, including or omitting optional elements, further comprising: a first mixer and a second mixer configured to mix the in-phase sign signal and the quadrature sign signal with a first local oscillator signal and a second local oscillator signal, respectively, and provide mixed sign signal outputs to different sign inputs of the sign branch to the RFDAC.

Example 22 includes the subject matter of any one of Examples 19-21, including or omitting optional elements, wherein the unsigned LO leakage suppression component is configured to generate a first DC bias and the signed LO leakage suppression component is configured to generate a second DC bias that is different and independent from the first DC bias.

Example 23 includes the subject matter of any one of Examples 19-22, including or omitting optional elements, further comprising a modification component configured to provide a mathematical operation to the signed LO leakage suppression component to modify the second DC bias based on a sign value of the baseband signal component.

Example 24 includes the subject matter of any one of Examples 19-23, including or omitting optional elements, wherein the unsigned LO leakage suppression component is further configured to provide a first offset to the signal processing chain before the split node that splits the signal processing chain into the magnitude branch and the sign branch.

Example 25 includes the subject matter of any one of Examples 19-24, including or omitting optional elements, wherein the signed LO leakage suppression component is configured to provide an offset along the magnitude branch after the split node that splits the signal processing chain into the magnitude branch and the sign branch to modify the in-phase magnitude signal and the quadrature magnitude signal to the RFDAC.

Example 26 is a method of a communication device comprising: receiving a baseband signal at an input of a signal processing chain of a radio frequency digital-to-analog converter (RFDAC) to up-convert the baseband signal to a radio frequency, and convert the baseband signal to an analog signal along a transmission path; providing a carrier signal via a local oscillator to the baseband signal for processing to the analog signal and generate an LO leakage comprising a signed LO leakage and an unsigned LO leakage; suppressing the unsigned LO leakage from the baseband signal via an unsigned LO leakage suppression component; and suppressing the signed LO leakage independently of the unsigned LO leakage via a signed LO leakage suppression component.

Example 27 includes the subject matter of Example 26, including or omitting optional elements, further comprising: providing a magnitude signal component of the baseband signal via a magnitude component along a magnitude signal branch and a sign signal component of the baseband signal via a sign component along a sign signal branch in parallel to the magnitude signal branch, respectively, to the RFDAC, wherein the suppressing the signed LO leakage suppression via the signed LO leakage suppression component comprises providing an offset located within the magnitude signal branch of the signal processing chain and the suppressing the unsigned leakage suppression via the unsigned LO leakage suppression component comprising providing another offset located along the signal processing chain before the magnitude signal branch and the sign signal branch.

Example 28 includes the subject matter of any one of Examples 26-27, including or omitting optional elements, further comprising: providing an in-phase magnitude signal to the RFDAC along an in-phase magnitude branch and a quadrature magnitude path of the magnitude signal branch to the RFDAC; and providing, via an in-phase sign path of the sign signal branch, an in-phase sign signal to a first mixer coupled to the RFDAC and the local oscillator, and a quadrature sign signal along a quadrature sign path to a second mixer coupled to the RFDAC and the local oscillator.

Example 29 includes the subject matter of any one of Examples 26-28, including or omitting optional elements, further comprising: generating, via the unsigned LO leakage suppression component, a first offset to the signal processing chain, and providing an output along a magnitude signal branch and a sign signal branch that splits from the signal processing chain at a split node, wherein the signed LO leakage suppression component is configured to receive an input signal along the magnitude signal branch and provide a second offset to a second output along the magnitude signal branch that provides a magnitude signal to the RFDAC.

Example 30 is a system of a communication device comprising: means for receiving a baseband signal at an input of a signal processing chain of a radio frequency digital-to-analog converter (RFDAC) to up-convert the baseband signal to a radio frequency, and convert the baseband signal to an analog signal along a transmission path; means for providing a carrier signal via a local oscillator to the baseband signal for processing to the analog signal and generate an LO leakage comprising a signed LO leakage and an unsigned LO leakage; means for suppressing the unsigned LO leakage from the baseband signal via an unsigned LO leakage suppression component; and means for suppressing the signed LO leakage independently of the unsigned LO leakage via a signed LO leakage suppression component.

Example 31 includes the subject matter of Example 30, including or omitting optional elements, further comprising: means for providing a magnitude signal component of the baseband signal via a magnitude component along a magnitude signal branch and a sign signal component of the baseband signal via a sign component along a sign signal branch in parallel to the magnitude signal branch, respectively, to the RFDAC, wherein the suppressing the signed LO leakage suppression via the signed LO leakage suppression component comprises providing an offset located within the magnitude signal branch of the signal processing chain and the suppressing the unsigned leakage suppression via the unsigned LO leakage suppression component comprising providing another offset located along the signal processing chain before the magnitude signal branch and the sign signal branch.

Example 32 includes the subject matter of any one of Examples 30-31, including or omitting optional elements, further comprising: means for providing an in-phase magnitude signal to the RFDAC along an in-phase magnitude branch and a quadrature magnitude path of the magnitude signal branch to the RFDAC; means for providing, via an in-phase sign path of the sign signal branch, an in-phase sign signal to a first mixer coupled to the RFDAC and the local oscillator, and a quadrature sign signal along a quadrature sign path to a second mixer coupled to the RFDAC and the local oscillator.

Example 33 includes the subject matter of any one of Examples 30-33, including or omitting optional elements, further comprising: means for generating, via the unsigned LO leakage suppression component, a first offset to the signal processing chain, and providing an output along a magnitude signal branch and a sign signal branch that splits from the signal processing chain at a split node, wherein the signed LO leakage suppression component is configured to receive an input signal along the magnitude signal branch and provide a second offset to a second output along the magnitude signal branch that provides a magnitude signal to the RFDAC.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus of a mobile communication device comprising:
   a radio frequency (RF) frontend;
   a radio frequency digital-to-analog converter (RFDAC) configured to up-convert a digital baseband signal to a radio frequency, and convert the digital baseband signal from a signal processing chain to an analog signal, wherein the RFDAC is coupled to a local oscillator configured to provide an oscillator signal to the digital baseband signal of the signal processing chain, and generate a local oscillator (LO) leakage comprising a signed LO leakage and an unsigned LO leakage at an output of the RFDAC;
   an unsigned local oscillator LO leakage suppression component configured to suppress the unsigned LO leakage from the digital baseband signal; and
   a signed LO leakage suppression component configured to suppress the signed LO leakage.

2. The apparatus of claim 1, wherein the unsigned LO leakage suppression component is configured to provide a first offset at a first location along the signal processing chain, and the signed LO leakage suppression component is further configured to provide a second offset at a second location along the signal processing chain to the RFDAC to suppress the signed LO leakage separately or independently from the unsigned LO leakage.

3. The apparatus of claim 1, further comprising:
a magnitude component, coupled between magnitude branch of the signal processing chain and the RFDAC, configured to receive the digital baseband signal at a split node of the signal processing chain and generate a magnitude signal of the digital baseband signal along the magnitude branch to the RFDAC; and
a sign component, coupled between a sign branch of the signal processing chain and the RFDAC, configured to receive the digital baseband signal at the split node and generate a sign signal of the digital baseband signal along the sign branch to the RFDAC.

4. The apparatus of claim 1, wherein the unsigned LO leakage suppression component is further configured to receive the digital baseband signal and generate a first offset in the signal processing chain to suppress the unsigned LO leakage, and the signed LO leakage suppression component is further configured to receive a magnitude signal component of the digital baseband signal and generate a second offset in the signal processing chain to suppress the signed LO leakage from the magnitude signal component.

5. The apparatus of claim 1, wherein the unsigned LO leakage suppression component provides an output signal to a magnitude branch and a sign branch that are arranged in parallel to one another and coupled to inputs of the RFDAC, wherein the magnitude branch is configured to generate an absolute value signal of the digital baseband signal and the sign branch is configured to generate a sign value signal to a mixer component.

6. The apparatus of claim 1, wherein the signal processing chain comprises a quadrature path and an in-phase path coupled to a plurality of magnitude component inputs to the RFDAC and a plurality of sign component inputs to the RFDAC.

7. The apparatus of claim 3, wherein the signed LO leakage suppression component is coupled between the magnitude component and the RFDAC after a split of the digital baseband signal into the magnitude signal of the magnitude branch and the sign signal of the sign branch, and the unsigned LO leakage suppression is coupled between the signal processing chain and the split node before the splitting of the digital baseband signal into the magnitude signal of the magnitude branch and the sign signal of the sign branch.

8. The apparatus of claim 4, wherein the first offset comprises a common bias and the second offset comprises a modification of the common bias by a modification component configured to modify the second offset by a mathematical operation based on whether the magnitude signal component is a negative value or a positive value.

9. The apparatus of claim 5, wherein the mixer component, coupled to the local oscillator and the RFDAC, is configured to mix the sign value signal with a local oscillator signal of the local oscillator and provide an output to the RFDAC concurrent to the magnitude branch providing the absolute value signal to the RFDAC.

10. The apparatus of claim 8, wherein the unsigned LO leakage suppression component is further configured to generate the first offset independently from the second offset generated from the signed LO leakage suppression component, and the signed LO leakage suppression component with the modification component is configured to generate different second offsets based on whether the magnitude signal component comprises the negative value or the positive value, wherein the first offset and the different second offsets.

11. A system of a mobile communication device comprising:
a signal processing chain;
a radio frequency digital-to-analog converter (RFDAC) coupled to the signal processing chain and configured to receive a baseband signal from the signal processing chain, up-convert the baseband signal to a radio frequency, and convert the baseband signal to an analog signal along a transmission path;
a local oscillator configured to provide a carrier signal to the baseband signal to generate a local oscillator (LO) leakage comprising a signed LO leakage and an unsigned LO leakage;
a unsigned LO leakage suppression component, configured to suppress the unsigned LO leakage from the baseband signal; and
a signed LO leakage suppression component configured to suppress the signed LO leakage.

12. The system of claim 11, further comprising a magnitude signal branch and a sign signal branch in parallel to the magnitude signal branch, configured to provide a magnitude signal component of the baseband signal via a magnitude component and a sign signal component of the baseband signal via a sign component, respectively, to the RFDAC.

13. The system of claim 11, wherein the unsigned LO leakage suppression component is further configured to generate a first offset to the signal processing chain, and provide an output along a magnitude signal branch and a sign signal branch that splits from the signal processing chain at a split node, and wherein the signed LO leakage suppression component is configured to receive an input signal along the magnitude signal branch and provide a second offset to a second output along the magnitude signal branch that provides a magnitude signal to the RFDAC.

14. The system of claim 12, wherein the signed LO leakage suppression component is located within the magnitude signal branch of the signal processing chain and the unsigned LO leakage suppression component is located along the signal processing chain before the magnitude signal branch and the sign signal branch.

15. The system of claim 12, wherein the magnitude signal branch comprises an in-phase magnitude path configured to provide an in-phase magnitude signal to the RFDAC and a quadrature magnitude path configured to provide a quadrature magnitude signal to the RFDAC, and wherein the sign signal branch comprises an in-phase sign path configured to provide an in-phase sign signal to a first mixer coupled to the RFDAC and the local oscillator, and a quadrature sign path configured to provide a quadrature sign signal to a second mixer coupled to the RFDAC and the local oscillator.

16. The system of claim 13, wherein the sign signal branch is configured to provide a sign signal component to a mixer that combines the sign signal component with a local oscillator signal and provides a combined signal to the RFDAC.

17. The system of claim 13, wherein the first offset comprises a first DC bias, and the second offset, corresponding to the signed LO leakage, comprises a second DC bias or a third DC bias based on the magnitude signal.

18. The system of claim 17, wherein the unsigned LO leakage suppression component is further configured to provide the first DC bias from a common bias, and the signed LO leakage suppression component is further configured to provide the second DC bias or the third DC bias based on a modification of the common bias by a 2's complement or an added value to suppress the signed LO leakage independently of the unsigned LO leakage, wherein the modification comprises a function of whether the baseband signal comprises a positive signal value or a negative signal value and wherein the first DC bias, the second DC bias and the third DC bias are configured independently of one another unsigned LO leakage suppression.

19. An apparatus of a communication device comprising:
a signal processing chain comprising an in-phase path configured to process an in-phase signal of a baseband signal, and a quadrature path configured to process a quadrature signal of the baseband signal;
a magnitude branch, coupled to the signal processing chain at a split node and to a radio frequency digital-to-analog converter (RFDAC), comprising an in-phase magnitude path configured to provide an in-phase magnitude signal to an in-phase magnitude input of the RFDAC, and a quadrature magnitude signal path configured to provide a quadrature magnitude signal to a quadrature magnitude input of the RFDAC;
a sign branch, coupled to the signal processing chain at the split node and the RFDAC, comprising an in-phase sign path configured to provide an in-phase sign signal to an in-phase sign input of the RFDAC, and a quadrature sign path configured to provide a quadrature sign signal to a quadrature sign input of the RFDAC;
an unsigned LO leakage suppression component configured to suppress an unsigned LO leakage from an output of the RFDAC; and
a signed LO leakage suppression component, coupled to the RFDAC, configured to suppress a signed LO leakage along the signal processing chain.

20. The apparatus of claim 19, further comprising:
a local oscillator configured to provide a carrier signal to the sign branch to generate an analog signal at the RFDAC, and generate the signed LO leakage and the unsigned LO leakage at the output of the RFDAC in response to an up-conversion of the in-phase sign signal and the quadrature sign signal of the sign branch.

21. The apparatus of claim 19, wherein the unsigned LO leakage suppression component is configured to generate a first DC bias and the signed LO leakage suppression component is configured to generate a second DC bias that is different and independent from the first DC bias.

22. The apparatus of claim 19, wherein the unsigned LO leakage suppression component is further configured to provide a first offset to the signal processing chain before the split node that splits the signal processing chain into the magnitude branch and the sign branch.

23. The apparatus of claim 19, wherein the signed LO leakage suppression component is configured to provide an offset along the magnitude branch after the split node that splits the signal processing chain into the magnitude branch and the sign branch to modify the in-phase magnitude signal and the quadrature magnitude signal to the RFDAC.

24. The apparatus of claim 20, further comprising:
a first mixer and a second mixer configured to mix the in-phase sign signal and the quadrature sign signal with a first local oscillator signal and a second local oscillator signal, respectively, and provide mixed sign signal outputs to different sign inputs of the sign branch to the RFDAC.

25. The apparatus of claim 21, further comprising a modification component configured to provide a mathematical operation to the signed LO leakage suppression component to modify the second DC bias based on a sign value of the baseband signal component.

* * * * *